United States Patent Office 3,301,610
Patented Jan. 31, 1967

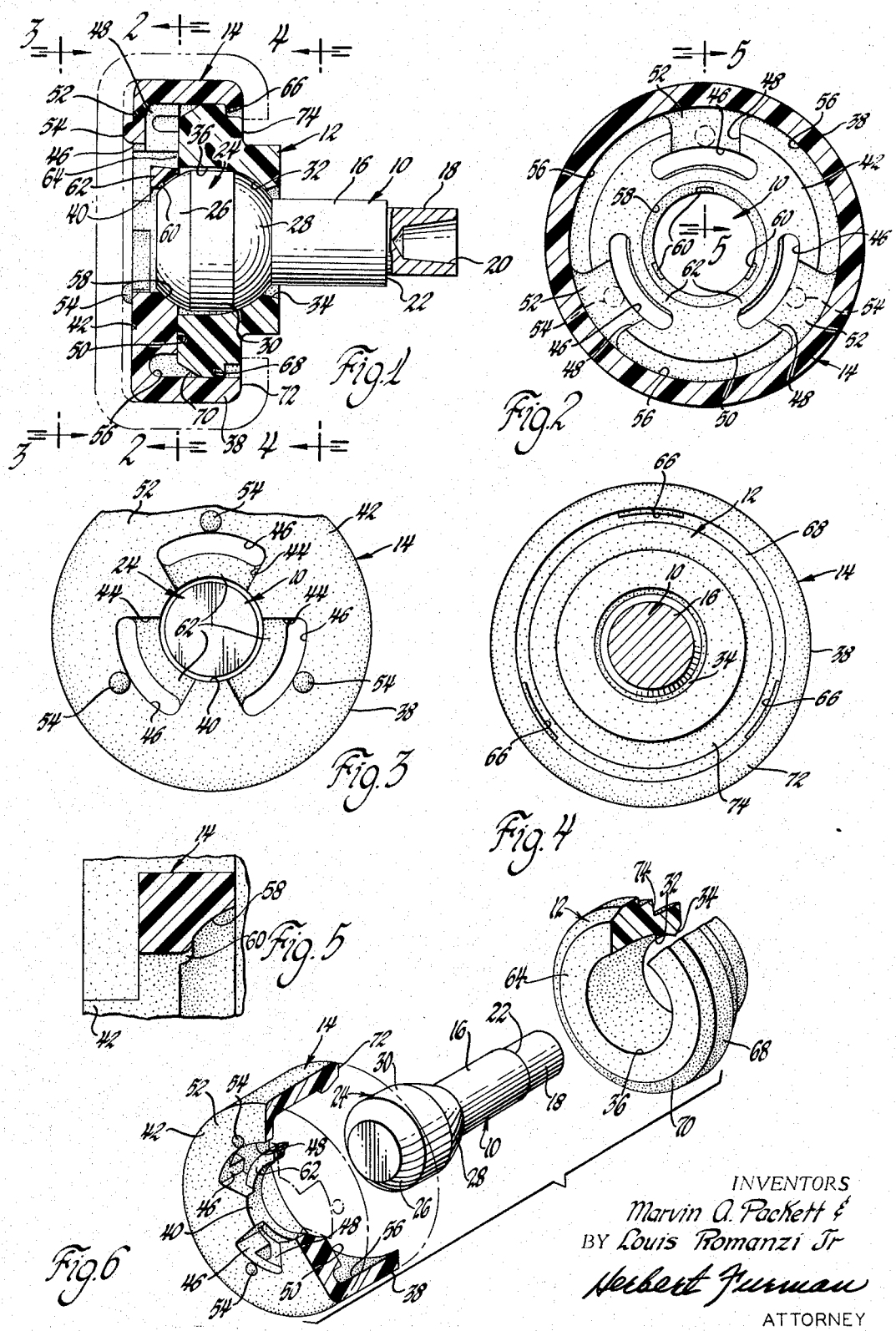

3,301,610
GUIDE ROLLER ASSEMBLY
Marvin A. Packett and Louis Romanzi, Jr., Detroit, Mich., assignors to General Motors Corporation, Detroit, Mich., a corporation of Delaware
Filed June 24, 1964, Ser. No. 377,645
5 Claims. (Cl. 308—3.8)

This invention relates to guide rollers and more particularly to a guide roller assembly for vehicle body window regulators.

One feature of this invention is that it provides an improved guide roller assembly for connecting a window regulator member to a channel member. Another feature of this invention is that it provides an improved guide roller assembly including a pair of roller members adapted to be releasably secured together to provide a guide roller and to house a stud member securing the guide roller to a window regulator member. A further feature of this invention is that the stud member includes spaced bearing portions engageable with respective bearing seats provided on the roller members. Yet another feature of this invention is that one of the roller members includes a plurality of projections formed integrally therewith and adapted to engage the channel member to provide a rattle-free connection between the guide roller and the channel member. Yet a further feature of this invention is that the projections are formed on a thin walled portion of the one roller member so as to be axially deflectable. Still another feature of this invention is that the roller members are formed of molded plastic material and include means for self-retainingly securing the members together. Still a further feature of this invention is that it provides an improved guide roller assembly including a pair of roller members, each having a bearing seat adapted to engage a stud member to provide a universal joint, with at least one of the bearing seats including takeup means to assure seating of the stud member on each of the seats.

These and other features of the guide roller of this invention will be readily apparent from the following specification and drawings wherein:

FIGURE 1 is a partially broken away side elevational view of a guide roller assembly according to this invention;

FIGURE 2 is a sectional view taken generally along the plane indicated by line 2—2 of FIGURE 1;

FIGURE 3 is a view taken generally along the plane indicated by line 3—3 of FIGURE 1;

FIGURE 4 is a view taken generally along the plane indicated by line 4—4 of FIGURE 1;

FIGURE 5 is an enlarged sectional view taken generally along the plane indicated by line 5—5 of FIGURE 2; and FIGURE 6 is a partially broken away exploded perspective view.

Referring now particularly to FIGURE 1 of the drawings, the guide roller assembly generally includes a stud member 10 and a male roller member 12 and female roller member 14 which provide a guide roller. The stud member 10 is adapted to be secured to a window regulator member and the guide roller is adapted to be pivotally and slidably received within a generally C-shaped guide channel, indicated schematically in FIGURE 1, to operatively connect the guide channel and window regulator member.

The stud member 10 generally includes a shank 16 having at one end thereof a shank portion 18 of reduced diameter provided with an outwardly opening recess 20. Portion 18 is adapted to be received within an opening in the window regulator member, and to be headed over the member to hold the member in engagement with the shoulder 22 of shank 16. Member 10 also includes a head portion 24 having axially spaced generally spherically shaped bearing portions 26 and 28 separated by an intermediate annular portion 30.

The roller member 12 is generally annular in shape and includes a spherically shaped seat 32 complementary to portion 28 of the stud member 10 and seating thereagainst upon assembly of the parts. An outwardly flaring or tapered opening 34 is provided adjacent the seat 32 to allow the guide roller and the stud member to swivel relative to each other. It will be noted that the seat 32 of the member 12 merges into an annular or cylindrical bore 36 spaced from the annular portion 30 of the stud member so that there is no bearing connection therebetween.

The roller member 14 is generally annular in shape and includes an outer annular wall or tire portion 38 which is adapted to roll along one of the legs of the C-shaped channel member when the roller member is received therewithin. The roller member 14 is further provided with a central annular bore 40. Portions of the outer surface of the annular wall 42 of the member 14 are cut away to provide three generally triangularly shaped recesses 44 which are spaced equally about the axis of the roller member 14. An elongated closed end arcuate slot or opening 46 extends from the radially outer ends of each of the recesses 44 through the wall 42. As shown in FIGURE 2, recesses 48 are provided in the inner surface 50 of wall 42 at the location of each of the slots 46, with each of the recesses 48 extending between the radially outer edges of the slots 46 and the tire portion 38 of the roller member 14.

The recesses 48 are provided so as to leave thin wall portions 52 of wall 42. Each thin wall portion 52 is provided with an integral node or projection 54, with these projections being spaced equiangularly about the axis of the roller member 14 and also being located on a radius which bisects their respective recesses 44 and 48 and slot 46. The inner surface 50 of wall 42 is further provided with annular grooves 56 which are located immediately adjacent the tire portion 38 of the roller member 14 and which join or interconnect each pair of adjacent recesses 48, although the recesses 48 are deeper than the grooves 56. A generally spherical bearing seat 58 merges into the bore 40 and includes three equiangularly spaced nodes or projections 60 which are located on the same radii as the nodes or projections 54 and are provided on rib portions 62 of the wall 42 which are of less thickness than the wall since they extend across the radially inner ends of the recesses 44 as can be seen in FIGURE 3.

In order to assemble the guide roller to the stud member, the shank 16 of the stud member is first inserted through the opening 34 of member 12 to seat the portion 28 of the stud member on the surface 32. Thereafter the assembled stud member and roller member 12 are inserted within the roller member 14 until the annular face 64 of the roller member 12 engages the inner surface 50 of the roller member 14 as shown in FIGURE 1. It will be noted that the tire portion 38 of the roller member 14 is provided with three equiangularly spaced radially inwardly extending lugs or projections 66, FIGURE 4, which snap over and behind an annular shoulder 68 of roller member 12 in order to hold the annular face 64 of the roller member 12 in tight engagement with the inner surface 50 of the wall 42 of member 14. Shoulder 68 is cut away at 70 to provide a cam or guide surface which engages the projections 66 upon initial insertion of the roller member 12 within the roller member 14 so as to deform or deflect the tire portion 38 of the roller member 14 until the projections 66 can snap over and behind the shoulder 68.

After assembly of the roller members 12 and 14, it will be noted with reference to FIGURE 1 that the bearing portion 26 of the stud member seats on the seat 58 of the roller member 14 and that each of the rib portions 62 of the wall 42 are slightly twisted or deformed due to the engagement of the projections 60 with the portion 26 to thereby provide a take-up means ensuring that the portion 28 will tightly seat against the seat 32 and that the portion 26 will either seat on the seat 58, if the part is manufactured with the desired tolerances, or seat on the projections 60.

After assembly of the roller members 12 and 14 and the stud member 10, the stud member may be secured to a window regulator member as previously described and then inserted within the channel member. When the guide roller assembly is inserted within the channel member, the nodes or projections 54 engage the base wall of the channel member to in turn bias the face 72 of the tire portion 38 and generally coplanar face 74 of the roller member 12 into tight engagement with the juxtaposed portions of the channel member which extend inwardly from the legs thereof. Thus, these nodes or projections ensure a rattle-free connection between the guide roller assembly and the channel member.

Thus, this invention provides an improved guide roller assembly.

What is claimed is:

1. A guide roller assembly for connecting a window regulator member and a guide channel member comprising, in combination, an annular member having an axial bore merging at one end thereof into a spherical seat, a roller member having a spherical seat adapted to be located adjacent the other end of said bore, means detachably interconnecting said annular member and said roller member to provide a guide roller having axially spaced spherical seats, and a stud member having spaced spherical bearing portions respective to each of said seats and bearing thereagainst and an intermediate annular portion located within said bore in spaced relationship thereto.

2. A guide roller assembly for connecting a window regulator member and a guide channel member comprising, in combination, an annular member having an axial bore opening to one radial wall thereof and merging into a spherical seat opening to the other radial wall thereof, a roller member having a spherical seat in one radial wall thereof and an outer axially extending annular wall surrounding said second spherical seat and receiving said annular member therewithin to locate said one radial wall of said annular member and said roller member in abutting relationship and said bearing seats in axially spaced relationship, means detachably interconnecting said annular member and said roller member to provide a guide roller, a stud member having spaced spherical bearing portions respective to each of said seats and bearing thereagainst and an intermediate annular portion of lesser size than said axial bore and housed therein.

3. A guide roller assembly for connecting a guide channel member and a window regulator member comprising, in combination, a guide roller having an annular wall, a plurality of deflectable webs interconnecting circumferentially spaced portions of said roller wall, said webs and said portions being shaped to provide a bearing seat and means on said webs projecting into said seat and adapted to be engaged by a bearing portion of a stud member to deflect said webs relative to said portions.

4. A guide roller assembly for connecting a window regulator member and a guide channel comprising, in combination, an annular member having a bearing seat, a roller member having an annular wall and a plurality of deflectable webs interconnecting circumferentially spaced portions of said wall, said webs and said portions being shaped to provide a bearing seat located in axially spaced relationship to said first bearing seat, a stud member having bearing portions respective to each of said seats and bearing thereagainst, and means on said webs engageable with a bearing portion of said stud member to provide a take-up means upon seating of said bearing portion in said second seat, said webs being deflectable upon said means engaging said bearing portion.

5. A guide roller assembly for connecting a window regulator member and a guide channel comprising, in combination, an annular member having a bearing seat, a roller member having an annular wall and a plurality of deflectable webs interconnecting circumferentially spaced portions of said wall, said webs and said portions being shaped to provide a bearing seat located in axially spaced relationship to said first bearing seat, a stud member having bearing portions respective to each of said seats and bearing thereagainst, and projections on said webs engageable with a bearing portion of said stud member to provide a take-up means upon seating of said bearing portion in said second seat, said webs being deflectable upon said projections engaging said bearing portions.

References Cited by the Examiner

UNITED STATES PATENTS

| 2,149,983 | 3/1939 | Smith | 308—72 |
| 2,711,352 | 6/1955 | Hasko | 308—72 |
| 2,805,107 | 9/1957 | Warker | 308—190 |
| 2,855,232 | 10/1958 | Kozak | 287—87 X |
| 2,973,980 | 3/1961 | Vogt | 287—87 |
| 3,078,498 | 2/1963 | Morgan | 16—42 |
| 3,199,930 | 8/1965 | Carleton. | |
| 3,243,237 | 3/1966 | Sprecher | 308—3 |

FOREIGN PATENTS 628,786   10/1961   Canada.

MARTIN P. SCHWADRON, *Primary Examiner.*

DAVID J. WILLIAMOWSKY, *Examiner.*

L. L. JOHNSON, *Assistant Examiner.*